United States Patent [19]

Ogasawara

[11] Patent Number: 5,004,967
[45] Date of Patent: Apr. 2, 1991

[54] METHOD AND DEVICE FOR CONTROLLING SLIDE MOTION OF A VEHICLE SEAT

[75] Inventor: Hiromitsu Ogasawara, Akishima, Japan

[73] Assignee: Tachi-S Co., Ltd., Tokyo, Japan

[21] Appl. No.: 495,358

[22] Filed: Mar. 16, 1990

[51] Int. Cl.⁵ ............................................. G05B 19/42
[52] U.S. Cl. ................................ 318/568.1; 318/466; 318/468; 297/330
[58] Field of Search ............... 318/568, 55, 467, 434, 318/466, 469, 468, 486, 443, 15; 297/330, 374, 408, 61, 391, 410, 409, 284, 65, 1; 364/424.05, 174, 425; 180/6.5, 907; 280/808

[56] References Cited

U.S. PATENT DOCUMENTS

| | | | |
|---|---|---|---|
| 4,264,849 | 4/1981 | Fleischer et al. | 318/568.1 |
| 4,267,494 | 5/1981 | Matsuoka et al. | 318/568.1 |
| 4,404,632 | 9/1983 | Harada et al. | 364/424.05 |
| 4,434,468 | 2/1984 | Caddick et al. | 318/466 X |
| 4,463,426 | 7/1984 | Caddick et al. | 318/466 X |
| 4,547,718 | 10/1985 | Ratzel et al. | 318/568.1 |
| 4,682,088 | 7/1987 | Sullivan | 318/466 X |
| 4,689,537 | 8/1987 | Mizuta et al. | 318/466 X |
| 4,808,897 | 2/1989 | Saito et al. | 297/330 X |
| 4,845,620 | 7/1989 | Parker | 318/466 X |
| 4,881,020 | 11/1989 | Hida et al. | 318/468 X |

*Primary Examiner*—Paul Ip
*Attorney, Agent, or Firm*—Oldham & Oldham Co.

[57] ABSTRACT

Method and device for controlling a slide motion of a vehicle seat, wherein when the seat is moved from a seating position to a backward position, the rotation number of a motor causing such movement is counted up from zero and memorized by a counter, so that the seat is returnable to the seating position precisely in accordance as the counter counts down that memorized rotation number to zero. This control is effected by switch means electrically arranged with the motor via electric circuits, and the counter is reset to zero every time of initial operation of the switch means, thus allowing free setting by different occupant of the seat positions without need for hitherto inputting works inherent in computer control.

9 Claims, 4 Drawing Sheets

METHOD AND DEVICE FOR CONTROLLING SLIDE MOTION OF A VEHICLE SEAT

BACKGROUND OF THE INVENTION

1. Field of the Invention

The present invention relates to a method and device for controlling the sliding movements of a vehicle seat in order to adjustably move the seat between a given seating position and retracted position to permit a smooth climbing and descending of an occupant onto and from the seat.

2. Description of Prior Art

Climbing and descending onto and from a vehicle seat has been improved, using a slide mechanism in the seat to effect a fore-and-aft movement of the seat between a seating position and backward position. In particular, the slide mechanism is indispensable for a driver's seat because a steering wheel is projected in front of the seat, which is good during driving the vehicle but a bar against easy climbing and descending of the driver onto and from the seat. Recently, the slide mechanism is electrically controlled by operation of a switch to provide a more improved operationability, so that the driver maY control the slide mechanism to move the seat to a given backward position when he or she climbs onto or descends from the seat.

In view of the seating position being different for an individual occupant, the slide mechanism of this kind has been provided with a microcomputer to memorize a preferred seating position for each occupant and thus the occupant can set his or her own best seating position without having a trouble of re-setting the seating position each time of climbing onto the seat for drive. For this purpose, in a hitherto computerized system, an identification code for each occupant (driver) is utilized: Once placing the identification code in memory of the mircrocomputer, a ready access thereto is made possible by inputting the code from a control board equipped in the vehicle.

However, to set an optimal seating position, the occupant is required to preset and store it in memory through several steps of operations, and where the occupant is a beginner to operate such presetting steps or has not knowledge about his optimal seating position, he or she presets and stores an improper seating position, and further feels it annoying to conduct such code inputting work before climbing onto the seat. Additionally, a repeated movements of the seat between a set seating position and backward position may cause an overrun of the seat beyond the set movement range, which produces and accumulates erroneous code inputs in the microcomputer, with the result that the errors need correcting by a compensation means incorporated in the microcomputer and the control device on the whole becomes too expensive to be assembled. Moreover, as far as a motor control is concerned, there has been no concept in this seat slide control as to the rotation rate adjustment of the motor. Hitherto, the motor has been set at a certain rate for its rotation, and the seat is moved at a moderate speed between the seating and backward postions. This becomes a problem in that an occupant can not control the seat sliding rate (or speed), when he or she wishes to draw backward the seat rapidly or make it move slow for fine adjustment to attain a best seating position.

It is a second purpose of the present invention to alleviate memorization of erroneous input data generated from the overrun of the seat.

For such purpose, shortly before the seat is moved from the seating position to the backward position, the counter resets the memorized rotation number of the motor to zero and starts to count up the same with the backward movement of the seat towards the backward position.

Accordingly, such automatic resetting insures avoiding accumulation of erroneous counts due to the rover-run, and eleminates the need to install a compensation means or CPU.

It is a third purpose of the present invention to facilitate the movement of the seat between the seating and backward positions and meke easy the adjustment of the seating and backward positions.

To this end, there is provided a circuit for changing the rotation rate of the motor, such that the motor is to be rotated at a high rate to move the seat rapidly between the seating and backward positions, whereas the rotation rate of the motor is a low to move the seat slowly in order for the seat to befe finely adjusted its seating and backward positions.

With the above arrangements, the control of the seat sliding motion is carried out without a computer, and the structure of the device is much simplified. The same goes for the operation.

In another aspect of the present invention, there are further provided a hand brake detector, seating detector, reclining angle detector, emergency stop switch, or the like, as a safe protection means, to insure safe controlling of the seat slide motion of the seat.

DETAILED DESCRIPTION OF PREFERRED EMBODIMENT OF THE INVENTION

Figure 1:
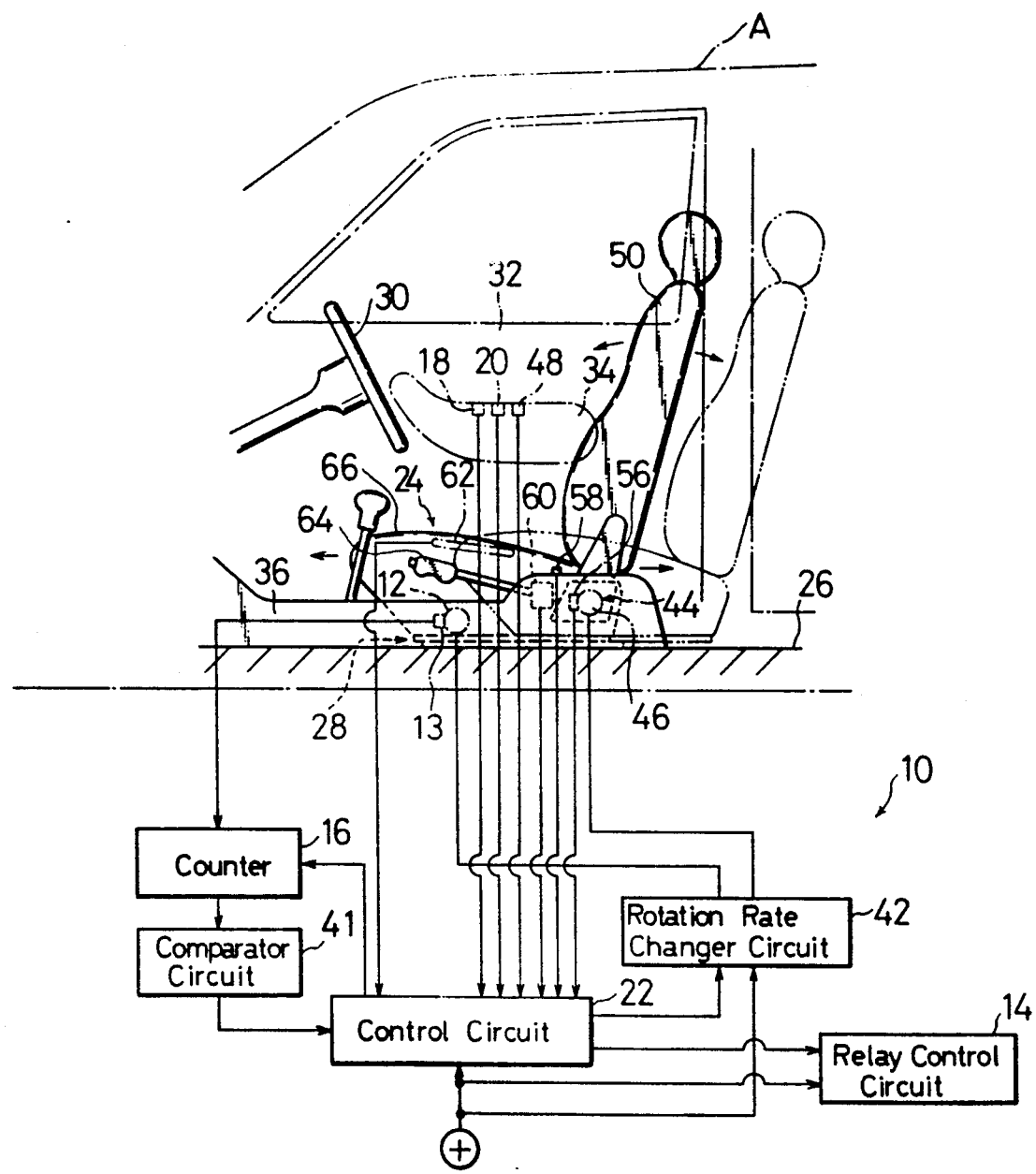
FIG. 1 is a schematic block view of a seat slide motion control device in accordance with the present invention.

Referring to FIG. 1, is illustrative a seat slide control device (10), which is basically comprised of a slide motor (12) equipped with a rotation sensor (13), a relay (14), a counter (16), an automatic operation switch (18), a manual adjustment switch (20), and a control circuit (22).

The slide motor (12) is defined hereby to be a motor for causing fore-and-aft sliding movement of a driver's seat (24) upon the floor (26) of an automobile (A). Precisely stating, the seat (24) is caused to move along the longitudinal direction of the automobile (A) forwardly and backwardly, namely, between a seating position as indicated by the solid line and backward position as indicated by the phantom line, by means of normal and reverse rotations of the motor (12) which actuates a slide mechanism (12) to move the seat (24) slidingly on the floor (26). Preferably, the slide motor (12) should be a DC geared motor, and the rotation sensor (13) be a reed-switch type one. The seating position of the seat (24) in the solid line is the one where a driver sits thereon for driving the automobile, and thus located adjacent to a steering wheel (30), whereas the backward position of the seat (24) is the one where it is moved backwardly away from the steering wheel (30) so that the driver may smoothly climb onto or descend from the seat (24) without hindrance of the steering wheel (30).

Figure 2:
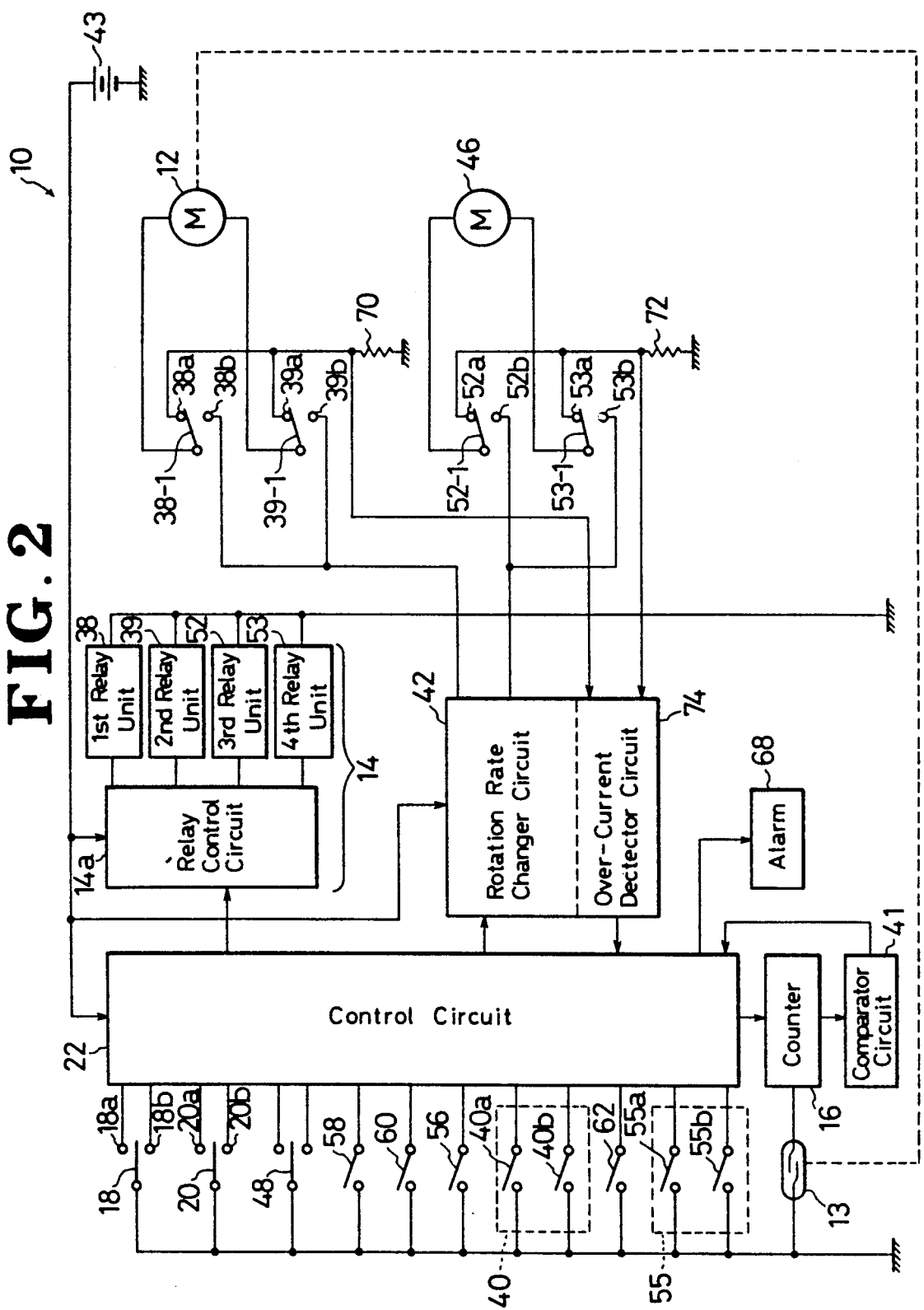
FIG. 2 is a block diagram showing electrical connection, centered by a control circuit, within the device.

As seen from FIGS. 1 and 2, the rotation sensor (13) is electrically connected with the counter (16). Hence, when the motor (12) is energized and starts to rotate, the rotation sensor (13) detects such rotation and send signals to the counter (16) which in turn counts the number of rotations of the motor (12) and stores it in memory. The counter (16) counts up the number with a normal rotation of the motor (12), and counts down it with a reverse rotation of the same.

As shown in FIG. 1, the automatic operation switch (18) and manual adjustment switch (20) is preferably provided at an arm rest (34) integral with the inner wall of the automobile (A). The automatic operation switch (18) is adapted for controlling the motor (12) so as to cause an automatical movement of the seat (24) between the seating and backward positions by simple one-touch switching, as will be described later. The manual adjustment switch (20) is for causing fine drive of the motor (12) by switching operations to permit manual adjustment of the seat in forward and backward directions relative to the automobile (A), thereby enabling free pre-setting of a desired seating position according to the physical constitution and seating taste of an occupant, as will also be described later. Those two switches (18)(20), preferably as in FIG. 2, are of a seesaw-type, self-returnable type having a neutral switch area, a first switch area and a second swtich area, and are respectively electrically connected with the control circuit (22), so that signals from the switches (18)(20) are inputted to control circuit (22).

Both automatic operation and manual adjustment switches (18)(20) may be provided in a console box (36).

The control circuit (22) is so constructed as to treat a signal inputted from the switches (18)(20) in a logic way, and output it as a suitable instruction signal. The output instruction signal, as understandable from both FIGS. 1 and 2, is then imparted to a relay control circuit (14a) of the relay (14). The relay control circuit (14a) treats the instruction signal of the control circuit (22) to emit a suitable relay signal, which energizes either of a first relay unit (38) and second relay unit (39) to set the corresponding relay contact (38-1 or 39-1) in contact with the make point (38a or 39b), to thereby energize the motor (12) for its drive control.

The automatic operation switch (18) is operated in a one-touch way, as noted above. Specifically, the first and second switch areas of the switch (18) are respectively for giving a normal motor drive signal and a reverse motor drive signal, and once turning on the first switch area for example, such normal drive "on" state is stored provisionallY in the memory device provided in the switch (!8) to ignore an erroneous turning-off of the same or turning on the second switch area thereof, thus keeping the initial "on" state going effective. This sort of switch is most suited for the present invention.

Designations (18a)(18b) refer to the first switch area and second switch area associated with the automatic operation switch (18), respectively, and designanations (20a)(20b) refer to the first switch area and second switch area associated with the manual operation switch.

It is noted that the first and second switch areas of both automatic operation and manual adjustment are respectively for turning on to emit a normal drive signal and a reverse drive signal so as to cause normal rotation and reverse rotation of the motor (12) through the control circuit (22) and relay (!4), whereby the the normal rotation of the motor (12) causes the seat (24) to move backwardly from the seating position to the backward position, and the reverse rotation of the motor causes the seat (24) to move forwardly in a direction from the backward position to the seating position.

Assuming now that the first switch area (18a) of the automatic operation switch (18) is turned on in attempt to move the seat (24) backwardly to the shown point indicated by the phatom line, a normal motor singal is inputted to the control circuit (22) which then outputs an normal drive instruction signal to the relay (14) in which the first relay unit (38) is then energized to set the corresponding relay contact (38-1) in contact with the make point (38a) while leaving the other relay contact (39-1) in contact with the berak point (39b), thereby allowing a current to run from a power source (43) to energize the motor (12) to rotate in the normal rotation. With such normal motor rotation, the seat (24) is moved bacwardly from the seating position to the backward position.

A limit switch (40) is provided, which includes a foward limit switch element (40a) and backward limit switch element (40b), both of them being electrically connected with the control circuit, as in FIG. 2. The forward limit switch element (40a) is adapted to limit the forward movement of the seat (24), and the backward limit switch element (40b) is adapted to limit the backward movment of the seat (24). Thus, when the the seat (24) reaches a most forward or most backward point, the forward limit switch (40a) or backward limit switch (40b) is turned on to cease the motor (12) and stops the movement of the seat (24), preventing thus overrun thereof. As will be explained later, the limit switch (40) is adjustable to comply with the fine adjsutment and presetting of the seating and backward positions by operating the manual adjustment switch (20). Preferably, the forward and backward switch elements (40a)(40b) are a push-type, self-returnable switch or the like.

The counter (16) is to be reset when the automatic operation switch (18) is turned on at its first switch area (48a) for moving the seat (24) to the backward position, to thereby count "0". This means that every time of turning on the switch (18) for the backward position, the counter (16) starts to count the the rotation number of the motor (12) from zero "0", whereupoon, subsequent to the resetting of the counter (16), the rotation number of the motor (12) starts to be counted up by the counter (16) from zero in response to the rotation sensor (18) detecting the number of rotations of the motor (12), and stored in memory until the seat (24 ) is stopped at the backward position. It is noted that the total number of rotations stored in memory is equal to the distance between the seating and backward positions.

On the other hand, when the switch (18) is turned on at its second switch area (48b) to return the seat (18) from the backward positions to the seating position, a reverse drive signal is sent from the switch (18) to the control circuit (22), from which a reverse rotation instruction signal is output into the relay control circuit (14) which in turn actuates the second relay unit (39) to set the corresponding relay contact (39-1) in contact the make point (39a), while leaving the other relay contact (38-1) in contact with the break point (38b), to thereby energize the motor (12) to rotate in the reverse direction, and move the seat (24) forwardlY form the backward position to the seating position. Here, the counter (16) counts down from the foregoing stored number of rotations of the motor (12), and as a result, the rotation number being counted down is compared in reference to zero by means of a comparator (41) dispsose between the counter (16) and control circuit (22). When the rotation number is counted down and reached "0" by the counter (16), the motor (12) is ceased its rotation, and therefore the seat is returned to the seating position.

Now, turning to a description of the manual operation switch (20), with the seat (24) being located at the seating position, when the manual operation switch (20) is turned on at its second switch area (20b), a reverse drive signal fro the reverse rotation of the motor (12) is sent from the switch (20) and input into the control circuit (22), from which then an instruction signal is output to the relay control circuit (14a) which in turn actuates the corresponding second relay unit (39) to set its relay contact (39-1) in contact with the make point (39a), while leaving the relay contact (38-1) in contact with the break point (38b), thus energizing the motor (12) to rotate in the reverse direction, and the seat (24) is moved forwardly. During this forward movement, if the driver turns off the manual operation switch (20), wishing to have the seat (24) stopped at a desired point between the seating and backward positions the motor (12) is ceased its rotation, with the relay contacts (38-1)(39-1) being alternately brought to contact with the make point (38a) and break point (39b) to place the motor (12) in a condition ready to rotate in the normal direction. In this way, the drever can adjust and preset the seating position at his or her desired point in the forward movement of the seat (24) toward the steering wheel (30).

Likewise, when the manual operation switch (20) is turned on at its first switch area (20a), then a normal drive instruction signal is output from the control circuit (22) into the relay control circuit (14a) which then actuates the relay contact changes causing the normal rotation of the motorm (12) thereby moving the seat (24) backwardly. During this backward movement, if the driver turns off the manual operation switch (20), wishing to have the seat (24) stopped at a desired point, the motor (12) is then ceased its rotation. In that way, the driver can adjust and preset the backward position at his or her desired point in the backward movement of the seat (24) away from the steering wheel (30).

In the slide control device (10), there is incorporated a motor rotation rate changer circuit (42) for changing the roation rate (speed) of the motor (12) into a high degree or a low degree. This circuit (42) is electrically connected with both motor (12) and the control circuit (22), and so constructed as to apply a high voltage or low voltage to the motor (12) in response to an instruction signal being sent from the control circuit (22). That is, when a signal is being inputted from the automatic operation switch (18) into the control circuit (22), an instruction is outputted from the control circuit (22) to the motor rotation rate changing circuit (42), so that a high voltage is applied to the motor (12). Then, in such case, the motor (12) is increased its rotation rate, so that the sea (24) may be moved quickly between the seating and backward positions under thd operation of the automatic operaion switch (18). On the other hand, when the manual adjustment switch (20) is being operated, a low voltage is applied to the motor (12) from the rotation rate changer circuit (42), thereby decreasing the rotation rate of the motor (12). Hence, the seat (24) may be moved slowly to permit precise adjustment and presetting for the respective seating and backward positions thereof.

It is noted here that the control circuit (22), relay control circuit (14a), and motor rotatioon rate changing circuit (42) are electrically connected with the battry (43), and that the motor (12) is conneted with the battery (43) via the rotation rate changing cirucit (42) so that a high or low voltage is imparted into the motor (12).

In addition to the above-descrived slide system, there is provided a reclining mechanism (44) as shown in FIG. 1. The reclining mechanism (44) is actuated by a motor (46) which is electrically connected with the control circuit (22) via the motor rotation rate changing circuit (42) and further connected via the control circuit (22) with a reclining switch (48). Operation of the reclining switch (48) effects an adjustment of the inclining angle of the seat back (50) relative to the seat cushion (66) through the drive of the motor (46). The reclining switch (48) is preferably of a seesaw-type, self-returnable switch having a neutral switch area, a first switch area (48a) and a second switch (48b), such that turning on the first switch area (48a) sends a reverse drive signal in order to cause the reverse roation of the motor (12) for inclining the seat back (50) forwardly, whereas turning on the second switch are sends a normal signal in order to cause the normal rotation of the motor (12) for inclining the seat back (50) backwardly. In the present slide control device (10), the control circuit area for controlling the reclining motor (46) cosists basically of the contol circuit (22), the relay control circuit (14a), a third relay unit (52), a second relay unit (53), a relay contact (52-1) and relay contact (53-1) which are electrically connected with the reclining motor (46). Accordingly, if the reclining switch (48) is turned on at its first switch area (48a), then, a reverse drive signal is sent to the control circuit (22) which outputs an instruction signal to the relay control circuit (14a), and then the corresponding first relay unit (52) is actuated to set the its relay contact (52-1) in contact with the make point (52a) while leaving the other relay contact (53-1) in contact with the break point (53b), whereby the motor (46) is energized to rotate in the reverse direction for causing the seat back (SB) to incline forwardly. To incline the seat back (SB) backwardly, the reclining switch (48) is turned on at its second switch area (48b) to impart a normal drive singal to the motor (46) through the control circuit (22), relay control circuit (14a), the corresponding relay unit (53), with the relay contact (53-1) set in contact with the make point (53a).

With this reclining mechanism, the seat back (50) may ber adjustded its forward and backward inclination at a desired angle by simple switch-over operatioin of the reclining switch (48).

The forward and backward inclination range of the seat back (50) is limited by a reclining limit switch (55) having a forward limit switch element (55a) and te backward limit switch element (55b).; The forward limit switch (50a) is to be turned on when the seat back (50) reaches a most forward inclination angle, to thereby stop forward inclination of the seat back (50), while he backward limit switch (50b) is to be turned on when the seat back (50) reaches a most backward inclination angle, to thereby stop the backward inclination. The reclining limit switch (55) is preferably a potensionmeter or a push-type switch.

The reclining mechanism (44) includes a reclining angle dectector (56) for detecting an angle degree at which the seat back (50) is inclined forwardly and backwardly, and the reclininig angle detector (56) is electrically connected with the control circuit (22). The reclining angle detector (56) serves to limit the backward inclination of the seat back (50) within a proeper range in which the seas back (50) is not contacted with a rear-seat occupant, and if the seat back (50) is inclined over such range, the slide motor (12) is instantaneously ceased its drive. Preferably, the reclining angle detector (56) is a potentiometer which measures the rotation agnle of the reclining motor (46). With this arrangement, the seat back (50) is prevented by the detector (56) against backward movement with its most backward inclination, even if the automatic operation switch (18) is turned on at its first switch area (18a), which insures a safe protection for a rear-seat occupant.

In the present invention, there is provivde another safety protection mechanism to avoid an interference and damage of an object or occupant during the continuous movements of the seat (24) between the seating and backward positions. Namely, as such protection means, an emergency stop switch (58) is provided for stopping the movement of the seat (24) both under the operation of the automatic operation and manual adjustment switches (18)(20). The emergency stop switch (58) is preferably an automatically returnable push-type switch, and disposed at a suitable location within an easy reach of the driver and other occupant. As shown, the emergency stop switch (48) is electrically connected with the control circuit (22). With this emergency stop arrangement, if malfunction or errounous control of the seat (24) takes place, the resultant movement of the seat (24) can be forcibly stopped by turning on the emergency switch (48) to protect an object or occupant, who is on the way along which the seat (24) is moved, against interference or damage of the seat (24).

As further protection mechanism, there are provided a hand brake detector (60) and seating detector (62). The hand brake detector (60), as shown in FIG. 1, is equipped at a hand brake (64), and is to be turned on responsive to the hand brake (64) being in a locked state, which means the halt of the automobile (A), and sends a signal to the control circuit (22). The control circuit (22) allows the operation of the automatic operation and manual adjustment switches (18)(20), only in such halt state of the automobile (A). Accordingly, where the hand brake (64) is in an unlocked state, which means that the automobile (A) is running along a road, the detector (60) is turned off and the control circuit (22) inhibits the movements of the seat (24) even if the automatic operation switch (18) or the manual adjustment switch (20) is operated. This pemrits a driver or other occupant to maintain his or her good sitting posture without being subject to a sudden change of the seating support of the seat (24) due to a mulfunction or errouneous operation of those switches (18)(20). The hand brake detector (60) is preferably an automatically returnalble push-type switch. With regard to the seating detector (62), it is arranged within the seat cushion (66) and is electrically connected with the control circuit (22). The seating detector (62) is adapted for detecting the presence or absence of an occupant on the seat (24) in such way that the pressure from the seat (24), if seated by the occupant, is detected and the detector sends a signal to the control circuit (22). The control circuit (22) determines the presence of the occupant on the seat (24) and permits the operation of the automatic operation switch (18) for moving the seat (24) from the backward position to the seating position, only in the presence of the driver on the seat (24)1. Accordingly, in absence of the driver on the seat (24), the automatic operation switch (18) as well as the manual adjustment switch (20) are set inoperative event if they are turned on or off, so that the tow switches (18)(20) are not operable until the driver sits on the seat (24) and the seat (24) is kept placed at the backward position until the driver sitting on the seat (24) turns on the second switch area (18b) of the automatic operation switch (18)

In the present embodiment, the seating detector (62) is of a pressure sensitive switch to detect the presence or absence of the driver on the seat (24) who applies a certain pressure to the switch. But, this is not necessary, and any other detecting means may be used instead of that. For example, an electrical capacitance type switch may be utilized, which is responsive to the electrical capacity amount in the body of the driver so as to detect his or her presence and absence on the seat (24).

In the control circuit (22), is incorporated an alarm (63), which will be state later. The alarm (63) emits a sound when the seat (24) reaches the seating or backward position, or when the foregoing protection functions are actuated, and so forth.

Designations (70)(72) denote resistances for detecting an over current. If an over current is flowed into those resistances (70)(72), then a overcurrent detectior circuit (74) sends a signal to the control circuit (22) which then causes an immediate stop of the slide motor (12) and reclining motor (46), to thereby prevent a heat generation in those two motors (12)(46).

The above-described controls will be explained methodically, hereinafter, with reference to the block flow chart in FIGS. 3 through 6.

Figure 3:
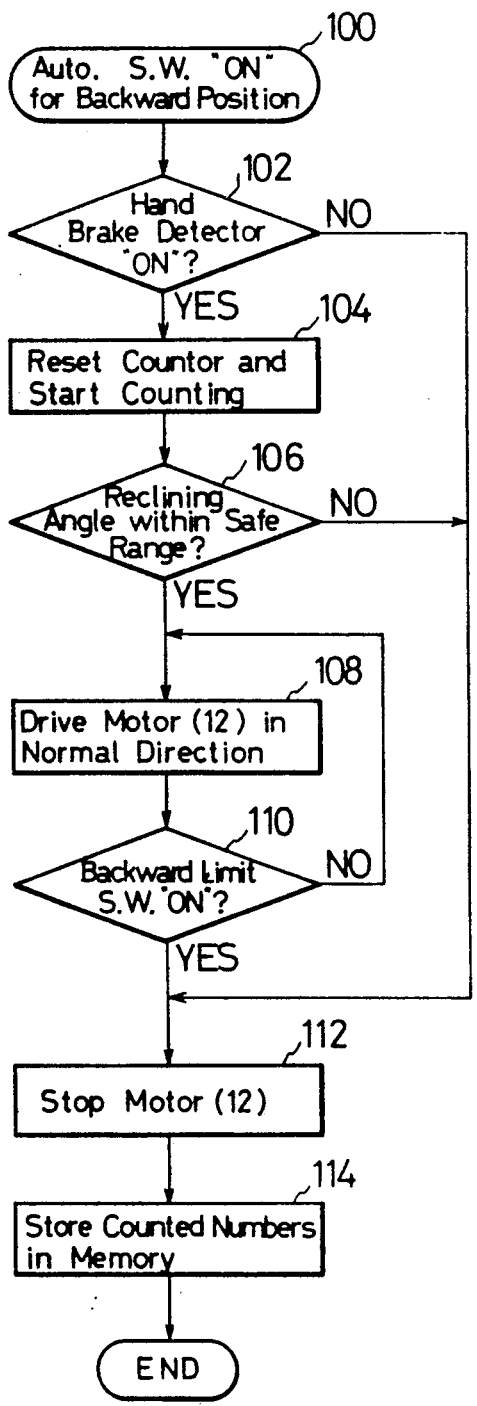
FIGS. 3 through 6 are block flow charts, explaining the step flows of seat movement controls under the switching operations together with a sound emitting of an alarm.

At first, let it be assumed that the driver's seat (24) is located at the seating position and the hand brake (64) is in a locked state to insure the halt of the automobile (A). Referring to FIG. 3, if a driver turns on the first switch area (18a) of the automatic operation switch (18), wishing to move the seat (24) towards the backward position, as in the block (100), then a step flow goes to an determination, as in the block (102), as to whether the hand brake (64) is turned on or not. Since the brake (64) is now "on", "YES" is decided at the block (102). Then, the step flow is directed to the instruction block (104) in which the counter (16) is reset to zero due to the automatic operation switch (18) being "on" at its first switch area (18a). At this point, as in the next decision block (106), it is determined whether or not the reclining angle of the seat back (50) falls within the give safe range stated above, i.e. the reclining angle range in which the seat back (50) is not contacted with a rear-seat occupant. If "YES" is decided there, the slide motor (12) is rotated at a high rate in the normal direction, as instructed in the block (108), and thus the seat (24) is caused to move rapidly in the backward direction towards the backward position.

Next, it is checked up as to whether or not the backward limit switch (40a) of the limit switch (40) is in a "on" state, as in the block (110). In other words, at this moment, the slide motor (12) continues to rotate in the normal direction, until the seat (24) reaches a most backward position, turning on the limit switch element (40a). During such backward movement of the seat (24), the counter (16) counts up the number of rotations of the motor (12) in response to signals being sent from the rotation sensor (13). When the seat (24) reaches the most backward position, the decision block (24) is given an answer in the affirmative, "YES", and then, at a block (112), is issued an instruction for ceasing the motor (12). As the motor (!2) is stopped, a total number of the motor rotations thus counted is placed in the memory of the counter (!6), as in the subsequent block (114). Hence, the seat (24) is stopped at the backward position, away from the steering wheel (30).

Looking again at FIG. 3, in the case where, at the block (102) for determining whether the hand brake detector (60) is "on", or not, a negative decision "NO" is given because of the hand brake (64) being in an unlocked state an the automatic operation switch (18) being by mistake turned on at it first switch area (18a) for the backward position, then the step flow is jumped to the motor stop block (112) and thus the motor (12) is immediately stopped, whereby even turning on the automatic operation switch (18) in the unlocked state of the hand brake (64) will in no waY cause the drive of the motor (12). Alternatively, if the hand brake (64) is unlocked during the motor (12) at work, the block (102) gives "NO" decision, and the motor (12) is stopped as in the block (112).

Further, if the reclining angle of the seat back (50) exceeds over the given safe range, at the block (106), "NO" is decided, leading the step to the stoppage of the motor (12) at the block (112), so as to insure a safe protection to a rear-seat occupant.

Figure 4:
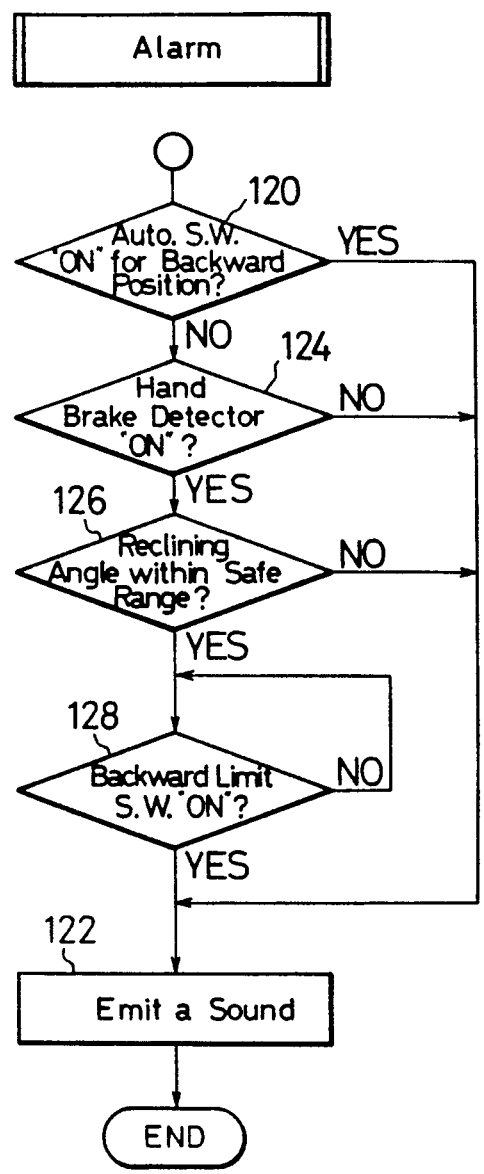

FIGS. 4 shows the sound emitting ways of the alarm (68) in accordance with the above-described flows of controls under operation of the automatic operation switch (18) as in FIG. 3. As shown, the alarm (68) emits a warning sound in response to the the operations or on/off states of the automatic operation switch (18), the hand brake (64), the reclining mechanism (44) and the backward limit switch element (40a).

At first, if "YES" is decided at a block (120) in which it is determined whether the automatic operation switch (18) is turned on at its first switch area (18a) or no:, then the alarm emits a sound, notifying such on state, as in a block (!22) from which is issued an instruction to emit a warning sound from the alarm (68). Thereafter, as such "on" operation is released due to the one-touch nature of the automatic switch (18), the block (122) gives "NO" decision, and then the step goes to a decision block wherein it is determined whether the hand brake detector (60) is in the "on" state, or not. At this stage, if the hand brake (64) is unlocked, "NO" is decided at the block (122), causing the alarm (68) to emit a sound, as in the block (122), and on the other hand, if the hand brake (64) is locked, "YES" is decided at the same block (122), in which case, the step proceeds to a block (126) for determining whether the relcining angle of the seat back (50) falls within the aforementioned safe angle range, or not. If the inclination of the seat back (50) exceeds such safe relining angle, "NO" is decided at the block (126), causing the alarm (68) to emit a sound, as in the block (122). If the seat back (50) is inclined within the safe reclining angle, then "YES" is anwered at that block (122), thus leading the step flow to a next block (126), in which whether or not the forward limit switch element (40a) is turned on, is determined.

At the block (126), if the seat (24) reaches the backward position and the forward limit switch element (40a) is turned on, an afirmative decision "YES" is made, causing thus the alarm (68) to emit a sound, as at the block (122).

With this alarm function, the driver can easily, quickly notice the drive and stop of the slide motor (12), by being given a warning sound, when the seat (24) reaches the seating or backward position, or when the hand brake detector (60) is turned off, or when the reclining angle detector (56) detects the excessive inclination of the seat back (50).

Figure 5:
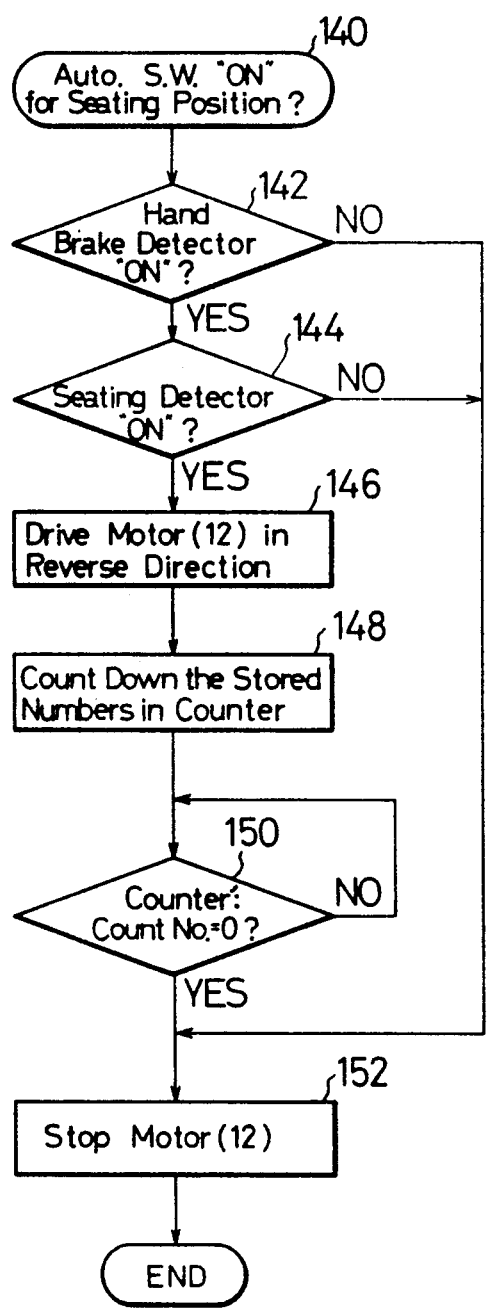

FIG. 5 shows a step flow of controls in the case of turning on the second switch area (18b) of the automatic operation switch (18) for returning the seat (24) to the seating position from the backward position.

When the automatic operation switch (18) is turned on at its second switch area (18b), the control step flow is led from the block (140) to a decision block (142) wherein it is determined whether the hand brake detector (60) is "on", or not. If "YES" is decided there due to the hand brake (64) being locked, then the step goes to a next block (144) for determining whether or not the seating detector (62) is "on", or not. Provided that a driver sits on the seat (24), pleacing the seating detector (62) in "on" state, the decision of the block (144) is in the affirmative, "YES", and thus, the slide motor (12) is driven to rotate in the reverse direction at a high rate, as instructed in a block (146). Simultaneously with that motor drive, as in a next block (148), the counter (16) starts to count down a total number of motor rotations which has been in memory of the counter (16) in causing normal drive of the motor (12) for moving the seat (24) to the backward position. Hence, the stored numbers in the counter (16) are counted down towards zero in accordance as the seat (24) approaches to the seating position.

Then, the step flow goes to the determination at a block (150) as to whether the counting number of the counter (16) comes to zero "0", or not. If "YES" is decided there, the motor (12) is stopped its reverse rotation, as instructed in a block (152), whereupon the seat (24) is returned to the seating position.

Assuming now that the hand brake (64) is unlocked and the driver, without noticing that, turns on the the automatic operation switch (18) at its second switch area (18a), the hand brake detector (60) is turned off, and a negative decision "NO" is given at the block (142), therefore, the step is jumped to the motor stop block (152). The motor (12) is not driven, and the seat (24) remains unmoved.

Further, if the driver turns on the second switch area (18b) before sitting on the seat (24), then the seating detector (62) is in "off" state and the decision at the block (144) is in the negative, "NO", and the step flow is led to the motor stop block (152), whereupon the motor (12) is not driven and the seat (24) remains unmoved.

Figure 6:
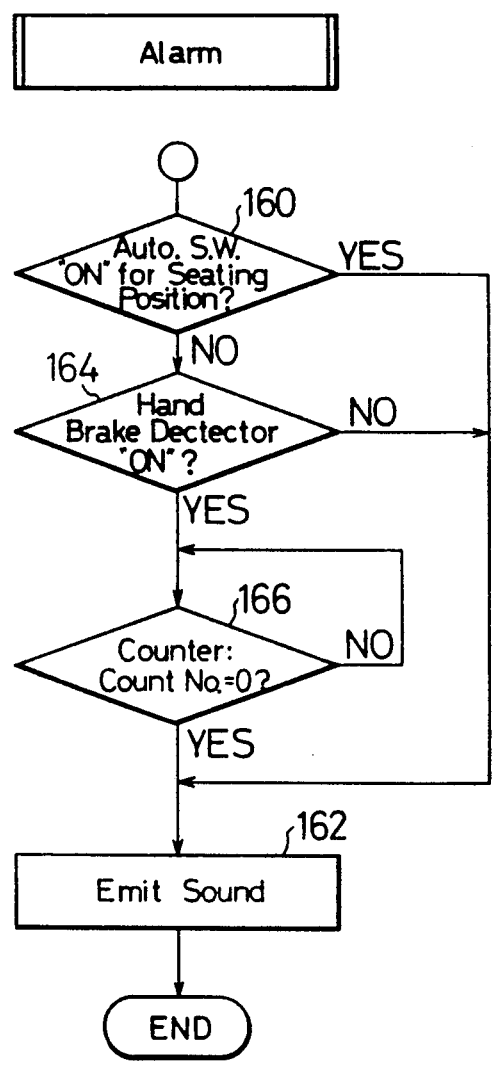

FIG. 6 shows the sound emitting ways of the alarm (68) in accordadce with the above-descried conrols for returning the seat (24) to the seating position.

The alarm (68) emits a sound, when "YES" is decided at the block (142) in the case of the second switch area (18b) being turned on, since the step is led, responsive to that "YES" decision, to the sound emit block (162). However, the one-touch nature of the automatic operation switch (18) releases such "on" state, and therefore the decision of the block (160) turns in the negative, "NO", which then leads the step flow to a next block (164) for determining whether the hand brake detector

(60) is turned on, or not. If the hand brake (64) is unlocked, then "NO" is decided at the block (164), and a sound is emitted from the alarm (68), as in the block (162). On the other hand, if the hand brake (60) is in a locked state, the decision at the block (164) is in the affirmative, "YES". and with the reverse rotation of the motor (12), causing the counter (16) to count down the stored numbers, the comparator circuit (41) checks on whether the rotation number of motor (12) reaches zero "0", as in a block (166). When the comparator circuit (41) detects zero, the decision at the block (166) is "YES", and thus, the alarm (68) emits a sound, as in the block (162).

Accordingly, with this alarm function, the driver can easily, quickly notice the drive and stop of the motor (12) at the time of turning on the second switch area (18b) of the automatic operation switch (18).

As briefly stated above, operating the manual adjustment switch (20) permits for a fine adjustment in setting the seating and backward positions of the seat (24). In operation, when the switch (20) is turned on at its first switch area (20a), the slide motor (12) is rotated at a lower rate in the reverse direction, so that the seat (24) is moved slowly in a forward direction, and when the switch (20) is turned on at its second switch area, the motor (12) is rotated at a low rate in the normal direction, so as to move the seat (24) slowly in a backward direction. Then, in either way, to turn off the corresponding switch area will stop the drive of the motor (12) to set the seat (24) at a desired point between the seating and backward positions, In a cooperative relation with the forward and backward limit switch elements (40a)(40b). Accordingly, the driver may adjust the seat (24) at a desired seating position and at a desired backward position, by operating the manual switch (20).

From the descriptions above, it is to be appreciated that, in accordance with the seat slide device (10), turning on the automatic operation switch (18) at its second switch area (18b), with the seat (24) located at the backward position, will cause the motor (12) to rotate in the reverse direction by a rotation number memorized in the counter (16) which has been counted up for the seat (24) to move to the backward position, whereby thus-controlled motor drive causes the seat (24) to move rapidly to the given seating position, precisely. For this reason, there is eliminated the necessity to preset and memorize a different seating position by operating another control switches and key boards, to meet various different seating tastes of different driver or occupant. Also, an identification code is not required, which must be needed for such conventional control system. The adjustment in the present invention is effected by moving the seat to a desired point and set it as such by simply turning on and off the manual adjustment switch (20).

It is further appreciated that the rotation number of the motor (12) is to be reset to zero and counted up each time the seat (24) is moved from the seating position to the backward position. This avoids an accumulation of a possible erroneous count which might causes due to the overrun of the seat (24), and thus alleviates the need to compensate for such miscounting by use of a computerized control, such as using a central processing unit. Therefore, the construction of the device is much simplified, contributing to a recduction of costs involved.

While having descried as above, it should be understood that the present invention is not limited to the illustrated embodiment, but any other modifications, replacements and additions may structurally be possible without departing from the spirit and scope of the appended claims.

What is claimed is:

1. A method for controlling a slide motion of a vehicle seat, in which said seat is slidingly moved between a seating position and backward position by a drive of a motor through a operation of a switch means, said seating position being able to be preset according to a seating taste of an occupant who sits on the seat and said backward position being defined where said seat is to be moved backwardly and stopped at a point away from a front of the vehicle to permit said occupant to climb onto or descend from said seat without hindrance of projected parts or fittings mounted in said vehicle, said method comprising the steps of:

detecting and memorizing a rotation number of said motor which is produced to cause said seat to move from a preset point of said seating position to said backward position; and causing said motor to rotate by a number equal to said memorized rotation number, so as to automatically return said seat to said preset point of said seating position;

said step of detecting and memorizing said motor rotation number involving counting said rotation number by means of a counter being actuated in response to a rotation sensor provided on said motor, said rotation sensor being adapted to detect said rotation number of said motor, wherein said method further includes the steps of:

providing a switch means having a first switch area for energizing said motor to rotate in a direction to cause said seat to move to said backward position and a second direction opposite to said first direction so as to return said seat to said seating position;

resetting said rotation number to zero in said counter when turning on said first switch area of said switch means, prior to said seat being caused by said motor to move to said backward position, in order that said counter starts to count up said rotation number from zero in response to said rotation sensor detecting rotation of said motor starting to rotate in said first direction;

causing said counter to memorize a total number of thus-counted-up rotations of said motor when said seat reaches said backward position; and permitting return of said seat from said backward position to said seating position by turning on said second switch area of said switch means, in which case, said counter counts down said memorized total rotation number and said seat is returned to said seating position until said total rotation number is counted down to zero by said counter.

2. The method as defined in claim 1, wherein said method further includes the steps of:

arranging that said motor is driven at a high rotation rate when operating said switch means;

providing a manual adjustment switch for adjustably driving said motor to set a desired point of said seat between said seating and backward position;

arranging that, when operating said manual adjustment switch, said motor is driving at a low rotation rate; and comparing said rotation number in reference to zero by means of a comparator.

3. The method as defined in claim 1, wherein said method further includes the steps of:
    detecting a locked or unlocked state of a hand brake provided in said vehicle;
    allowing operation of said switch means only when said hand brake is unlocked;
    detecting an inclination angle of a seat back of said seat relative a seat cushion thereof;
    allowing movement of said seat to said backward position only when said seat back is inclined within a given safe angle range preventing it against contact with an occupant sitting on a rear seat in said vehicle;
    detecting a presence or absence of an occupant on said seat; and
    allowing return of said seat from said back position to said seating position only when said occupant is present on said seat.

4. A device for controlling a slide motion of a vehicle seat which is slidable between a forward position for seating and a backward position for climbing onto or descending from said seat, said device comprising:
    a seat slide mechanism for allowing a sliding movement of said seat in forward and backward direction of the vehicle;
    a motor for causing said fore-and-aft movement of said seat;
    a sensor means for detecting rotation number of said motor;
    a means including a counter for counting and memorizing said rotation mnumber of said motor in response to said sensor means;
    a first switch means for controlling drive of said motor so as to cause movement of said seat between a seating position and a backward position, said seating position being defined at a point where an occupant sits on said seat and said backward position being defined where said seat is to be moved backwardly of said vehicle and stopped at a point away from a forward side of said vehicle to permit said occupant to climb onto or descent from said seat without hindrance of projecting parts or fittings mounted in said vehicle;
    a second switch means for controlling drive of said motor so as to adjust and set said seating position at a desired point;
    a control circuit electrically connected with said motor, said counting and memorizing means, said first switch means, and said second switch means, said control circuit processing signals sent from the respective said means to properly control drive of said motor;
    a circuit for changing a rotation rate of said motor, said circuit being incorporated with said control circuit so that said rotation rate of said motor is changeable according to said processing of said control circuit; and
    means for resetting said counter to zero when said seat is in a seating position and said first switch means is turned on, said counter counting up when said seat is moved toward a backward position and counting down when said seat is moved toward a seating position.

5. The device as defined in claim 4, wherein when said device further includes:
    a means for detecting lock and unlock state of a hand brake provided in said vehicle;
    a means for detecting presence or absence of an occupant on said seat;
    a means for detecting an inclination angle of a seat back of said seat relative to a seat cushion thereof;
    an emergency stop switch for forcibly stopping drive of said motor.

6. The device as defined in claim 4, wherein an alarm is arranged so that a sound is emitted to notice drive or stop of said motor.

7. The device as defined in claim 4 wherein said means for resetting said counter to zero includes a comparator.

8. The device as defined in claim 4 including a forward limit switch and a backward limit switch for limiting forward movement and backward movement, respectively, of said seat.

9. The device as defined in claim 4 wherein said first switch means is automatically operated and said second switch means is manually operated, said second switch means enabling an occupant of the seat to adjust and preset a desired seating position and a desired backward position by turning off the switch when a desired position is reached.

* * * * *